(12) United States Patent
Huff et al.

(10) Patent No.: US 11,312,211 B2
(45) Date of Patent: Apr. 26, 2022

(54) SLIDING VISOR

(71) Applicant: Irvin Automotive Products, LLC, Pontiac, MI (US)

(72) Inventors: David Huff, Waterford, MI (US); Aaron Levine, Commerce Township, MI (US)

(73) Assignee: IRVIN AUTOMOTIVE PRODUCTS, LLC, Pontiac, MI (US)

( * ) Notice: Subject to any disclaimer, the term of this patent is extended or adjusted under 35 U.S.C. 154(b) by 54 days.

(21) Appl. No.: 16/876,448

(22) Filed: May 18, 2020

(65) Prior Publication Data
US 2020/0282810 A1    Sep. 10, 2020

Related U.S. Application Data

(63) Continuation of application No. 15/919,357, filed on Mar. 13, 2018, now Pat. No. 10,688,850.

(51) Int. Cl.
*B60J 3/02* (2006.01)

(52) U.S. Cl.
CPC ............ *B60J 3/0239* (2013.01); *B60J 3/023* (2013.01); *B60J 3/026* (2013.01); *B60J 3/0282* (2013.01)

(58) Field of Classification Search
CPC ........ B60J 3/0239; B60J 3/0278; B60J 3/026; B60J 3/023
USPC .................................. 296/97.1, 97.11, 97.12
See application file for complete search history.

(56) References Cited

U.S. PATENT DOCUMENTS

| 3,710,674 | A | 1/1973 | Tabor |
| 3,926,470 | A | 12/1975 | Marcus |
| 4,000,404 | A | 12/1976 | Marcus |
| 4,174,864 | A | 11/1979 | Viertel et al. |
| 4,227,241 | A | 10/1980 | Marcus |
| 4,521,046 | A | 6/1985 | Foggini |
| 4,533,275 | A | 8/1985 | Foggini |
| 4,598,943 | A | 7/1986 | Scholz et al. |
| 4,617,699 | A | 10/1986 | Makamura |
| 4,679,843 | A | 7/1987 | Spykeman |
| 4,715,644 | A | 12/1987 | Lobanoff et al. |
| 4,729,590 | A | 3/1988 | Adams |
| 4,756,570 | A | 7/1988 | Cooper |
| 4,760,503 | A | 7/1988 | VandenBerge |
| 4,925,233 | A | 5/1990 | Clark |
| 4,973,020 | A | 11/1990 | Canadas |
| 4,993,772 | A | 2/1991 | Charen |
| 4,997,228 | A | 3/1991 | Kempkers |

(Continued)

*Primary Examiner* — Gregory A Blankenship
(74) *Attorney, Agent, or Firm* — Raggio & Dinnin, P.C.

(57) ABSTRACT

A sliding sun visor for use in a vehicle is disclosed. The sun visor includes a first and second visor body shell. The visor also comprises a pivot rod and a carrier slidingly arranged over the pivot rod. The first shell of the visor body includes a monorail arranged on an inside surface thereof. The carrier is slidingly engaged with the first shell wherein the carrier is arranged within or on the monorail. The carrier contacts a top portion of the monorail and a bottom portion of the monorail. The carrier is hence slidingly secured to the monorail and only connected to one of the shells used to engage to form a visor body. The visor bodies are secured via a press fit between a first boss arranged on a first shell and a second boss arranged on the second shell thus creating a secure connection that does not need screws to secure the visor halves to one another.

15 Claims, 11 Drawing Sheets

(56) References Cited

U.S. PATENT DOCUMENTS

| | | | |
|---|---|---|---|
| 4,998,765 A | 3/1991 | Van Onder et al. | |
| 5,011,211 A | 4/1991 | Svensson | |
| 5,059,016 A | 10/1991 | Lawassani | |
| 5,078,445 A | 1/1992 | VandenBerge | |
| 5,082,322 A | 1/1992 | Cekander et al. | |
| 5,131,711 A * | 7/1992 | Laferle | B60J 3/0278 24/662 |
| 5,161,850 A | 11/1992 | Reeder et al. | |
| 5,184,867 A | 2/1993 | Prillard | |
| 5,230,546 A | 7/1993 | Smith | |
| 5,232,192 A | 8/1993 | Akutagawa | |
| 5,331,518 A | 7/1994 | Roark | |
| 5,340,186 A | 8/1994 | Aymerich | |
| 5,409,285 A | 4/1995 | Synder et al. | |
| 5,428,513 A | 6/1995 | Hiemstra et al. | |
| 5,445,427 A | 8/1995 | Vandagriff | |
| 5,486,033 A | 1/1996 | Lecorvaisier | |
| 5,533,928 A | 8/1996 | Mori et al. | |
| 5,556,154 A | 9/1996 | Vaxelaire | |
| 5,560,704 A | 10/1996 | Hiemstra et al. | |
| 5,580,117 A | 12/1996 | Goclowski | |
| 5,580,118 A | 12/1996 | Crotty, III | |
| 5,645,308 A | 7/1997 | Fink | |
| 5,653,490 A | 8/1997 | Fink et al. | |
| 5,653,496 A | 8/1997 | Mori et al. | |
| 5,660,424 A | 8/1997 | Aymerich et al. | |
| 5,685,629 A | 11/1997 | Hemmeke et al. | |
| 5,823,603 A | 10/1998 | Crotty, III | |
| 5,855,443 A | 1/1999 | Faller et al. | |
| 5,967,587 A | 10/1999 | Collet et al. | |
| 6,010,174 A * | 1/2000 | Murdock | B60J 3/0239 296/97.11 |
| 6,010,175 A | 1/2000 | Bodar et al. | |
| 6,012,757 A | 1/2000 | Viertel et al. | |
| 6,024,399 A | 2/2000 | Viertel et al. | |
| 6,059,348 A | 5/2000 | Viertel et al. | |
| 6,131,985 A | 10/2000 | Twietmeyer et al. | |
| 6,135,610 A | 10/2000 | Beck et al. | |
| 6,139,083 A | 10/2000 | Fischer et al. | |
| 6,174,019 B1 | 1/2001 | Collet et al. | |
| 6,220,644 B1 | 4/2001 | Tiesler et al. | |
| 6,264,352 B1 | 7/2001 | Zapinski | |
| 6,334,626 B2 | 1/2002 | Nakajima et al. | |
| 6,368,114 B1 | 4/2002 | Inoue | |
| 6,382,697 B1 | 5/2002 | Mulder et al. | |
| 6,435,593 B2 | 8/2002 | Welter | |
| 6,439,638 B1 | 8/2002 | Kawasaki et al. | |
| 6,474,717 B2 | 11/2002 | Viertel et al. | |
| 6,475,937 B1 | 11/2002 | Preisler et al. | |
| 6,494,521 B2 | 12/2002 | Hennessey | |
| 6,511,029 B2 | 1/2003 | Sawayanagi | |
| 6,547,308 B2 | 4/2003 | Hamelink et al. | |
| 6,604,773 B2 | 8/2003 | Aoki et al. | |
| 6,612,637 B1 | 9/2003 | Crotty | |
| 6,637,799 B1 | 10/2003 | Tiesler | |
| 6,659,528 B1 | 12/2003 | Wilson | |
| 6,669,859 B1 | 12/2003 | Tiesler | |
| 6,679,538 B1 | 1/2004 | Sturt | |
| 6,685,257 B1 | 2/2004 | Beland et al. | |
| 6,692,059 B1 | 2/2004 | Mills | |
| 6,698,814 B1 | 3/2004 | Mills et al. | |
| 6,698,815 B1 * | 3/2004 | Mills | B60J 3/0282 296/1.11 |
| 6,707,674 B1 | 3/2004 | Bryant et al. | |
| 6,796,593 B2 | 9/2004 | Hennessey | |
| 6,799,795 B1 | 10/2004 | Zapinski | |
| 6,840,561 B2 | 1/2005 | Mills et al. | |
| 6,860,546 B1 | 3/2005 | Fero et al. | |
| 6,863,332 B2 | 3/2005 | Yasuhara et al. | |
| 6,910,725 B1 | 6/2005 | Lanser et al. | |
| 6,921,121 B2 | 7/2005 | Schneider et al. | |
| 6,923,490 B2 | 8/2005 | Peterson et al. | |
| 6,948,736 B2 | 9/2005 | DePottey et al. | |
| 6,962,385 B2 | 11/2005 | Wieczorek et al. | |
| 7,000,972 B2 | 2/2006 | Asai | |
| 7,025,399 B1 | 4/2006 | Crotty, III | |
| 7,032,949 B1 | 4/2006 | Wang et al. | |
| 7,036,877 B2 | 5/2006 | Schultz et al. | |
| 7,055,884 B2 | 6/2006 | Zapinski et al. | |
| 7,059,652 B2 | 6/2006 | Aoki et al. | |
| 7,086,681 B2 | 8/2006 | Fernandez et al. | |
| 7,090,281 B2 | 8/2006 | Davey et al. | |
| 7,108,308 B2 | 9/2006 | Remy | |
| RE39,316 E | 10/2006 | Murdock et al. | |
| 7,201,427 B2 | 4/2007 | Wang et al. | |
| 7,217,017 B2 | 5/2007 | Smith | |
| 7,281,751 B2 | 10/2007 | Hamelink et al. | |
| 7,311,427 B2 | 12/2007 | Barker et al. | |
| 7,320,493 B2 | 1/2008 | Kumakawa et al. | |
| 7,338,108 B2 | 3/2008 | Iwatsuka et al. | |
| 7,384,088 B2 | 6/2008 | Remy | |
| 7,416,239 B2 | 8/2008 | Lanser et al. | |
| 7,416,319 B2 | 8/2008 | Richard et al. | |
| 7,458,627 B2 | 12/2008 | Tiesler et al. | |
| 7,461,886 B1 | 12/2008 | Wang et al. | |
| 7,534,018 B2 | 5/2009 | Nicola | |
| 7,537,263 B2 | 5/2009 | Delphia | |
| 7,556,308 B2 | 7/2009 | Lee et al. | |
| 7,703,832 B2 | 4/2010 | Shorter et al. | |
| 7,717,491 B2 | 5/2010 | Beck et al. | |
| 7,784,847 B2 | 8/2010 | Asai | |
| 7,798,551 B2 | 9/2010 | Okazaki et al. | |
| 7,823,954 B2 | 11/2010 | Jones et al. | |
| 7,854,464 B2 | 12/2010 | Mori | |
| 7,866,724 B2 | 1/2011 | Olep et al. | |
| 8,333,422 B2 | 12/2012 | Ogawa et al. | |
| 8,434,811 B2 | 5/2013 | Rockafellow et al. | |
| 8,845,000 B2 | 9/2014 | Asai et al. | |
| 8,905,457 B2 | 12/2014 | Mertz | |
| 9,140,280 B2 * | 9/2015 | Martellotti | F16B 5/0664 |
| 9,186,962 B2 | 11/2015 | Huff et al. | |
| 9,475,365 B2 * | 10/2016 | Primo | B60J 3/0278 |
| 10,688,850 B2 * | 6/2020 | Huff | B60J 3/026 |
| 2001/0024048 A1 | 9/2001 | Hobson et al. | |
| 2001/0050493 A1 | 12/2001 | Welter | |
| 2002/0113454 A1 * | 8/2002 | Crotty, III | B60J 3/0278 296/97.1 |
| 2004/0145209 A1 * | 7/2004 | Peterson | B60J 3/0208 296/97.11 |
| 2005/0034555 A1 | 2/2005 | Staker | |
| 2005/0082868 A1 | 4/2005 | Wieczorek et al. | |
| 2006/0061008 A1 | 3/2006 | Karner et al. | |
| 2006/0087147 A1 * | 4/2006 | Kleyn | B60J 3/0278 296/97.1 |
| 2006/0175861 A1 | 8/2006 | Ikeda et al. | |
| 2007/0120388 A1 * | 5/2007 | Araga | B60J 3/0278 296/97.1 |
| 2009/0121513 A1 * | 5/2009 | Olep | B60J 3/0278 296/97.1 |
| 2010/0013263 A1 * | 1/2010 | Okazaki | B60J 3/0265 296/97.11 |
| 2010/0096878 A1 | 4/2010 | Wieczorek et al. | |
| 2010/0117395 A1 | 5/2010 | Wieczorek et al. | |
| 2011/0227362 A1 | 9/2011 | Rockafellow et al. | |
| 2011/0260492 A1 | 10/2011 | Ogawa et al. | |
| 2012/0119537 A1 * | 5/2012 | Fukatsu | B60J 3/0278 296/97.1 |
| 2016/0046175 A1 | 2/2016 | Huff et al. | |
| 2018/0236850 A1 * | 8/2018 | Soga | B60J 3/0278 |
| 2019/0283553 A1 * | 9/2019 | Huff | B60J 3/0278 |
| 2020/0282810 A1 * | 9/2020 | Huff | B60J 3/0282 |

\* cited by examiner

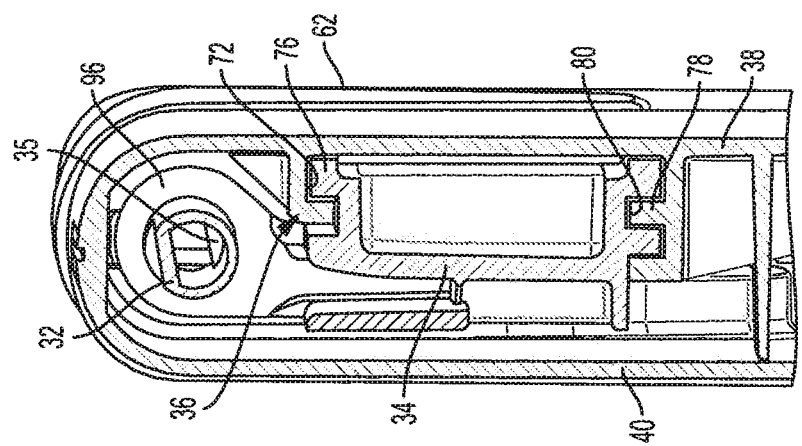
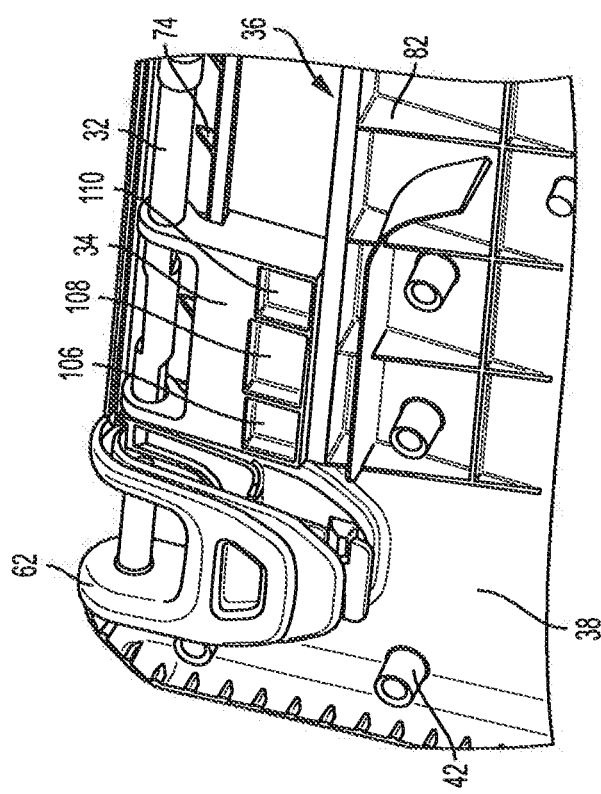
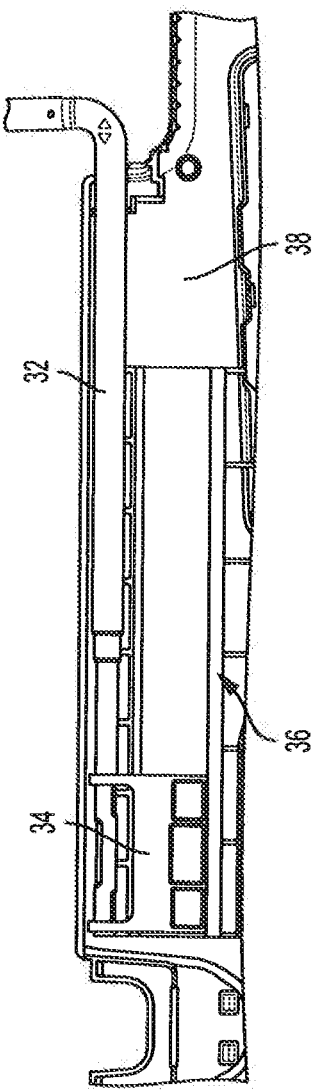
FIG. 6
FIG. 4
FIG. 5

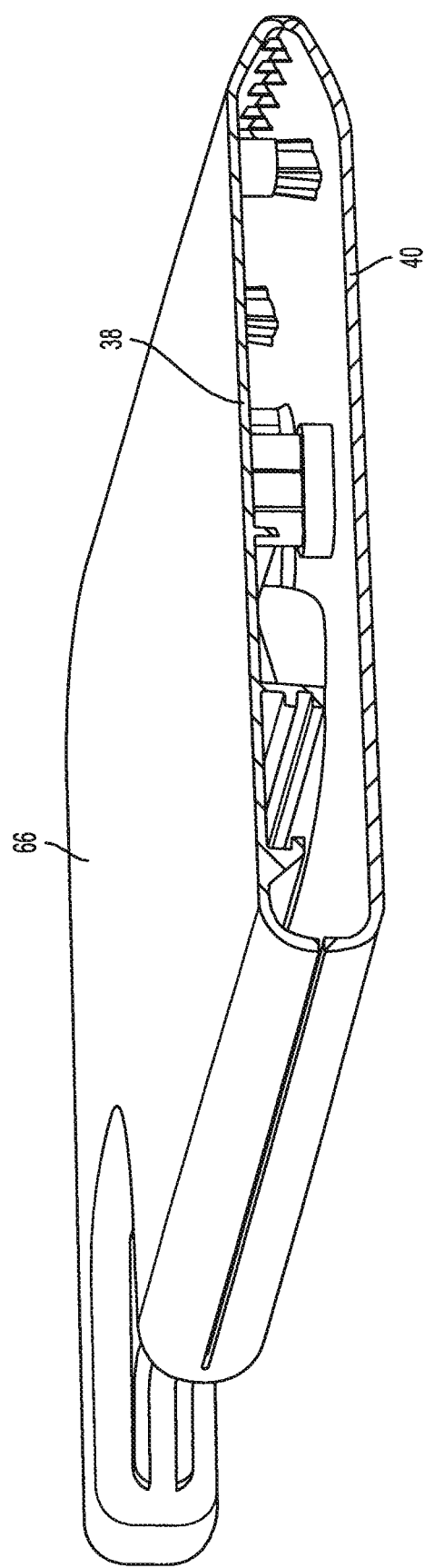

SLIDING VISOR

This application is a continuation of pending application Ser. No. 15/919,357—Filed Mar. 13, 2018

BACKGROUND OF THE INVENTION

1. Field of the Invention

The present invention generally relates to a movable sun visor for interior use in a vehicle, and more particularly relates to a sun visor wherein the visor body includes two visor body halves or shells adapted to have only one of those visors shells slidably retain a carrier attached to a pivot rod.

2. Description of Related Art

Sun visors are well known and widely used in the prior art. Many different types and designs have been successfully employed in vehicles over the years. Many of these prior art visors have been developed in a variety of ways through which visor bodies and other interior components may be constructed and mounted within the vehicle. Advances in design can often add complexities to the manufacturing processes for interior components. There has been and continues to be a premium in the automotive industry on cost savings and improvements in the efficiency and speed of the manufacturing processes for such components therein. One area of particular focus in the automobile technology field has been reducing the number and complexity of steps required to assemble interior components such as sun visors or visors for use in vehicles.

Generally in the prior art, manufacturing simplicity continues to drive innovations in the automotive industry, loss of quality and performance in the manufacturing components for the sake of facilitating production is seldom, if ever, acceptable. There is a substantial body of prior art relating to the specific structure of the visor to provide a strong, light weight construction that matches or compliments the interior vehicle trim in a cost effective manner. Of particular interest has been the clam shell type construction, which involves the molding of two shell pieces or clam shell halves, which are joined to form the visor body. In one typical clam shell design, the visor halves are formed as a single piece attached along the longitudinal edge and then folded to form the visor body. The exterior surface can be molded to provide a suitable visor surface or a desired outer covering may be added in a variety of different ways known in the prior art.

The clam shell design allows the visor body to be constructed relatively quickly and easily, however the various components that are attached to the visor clam shell halves must in some cases be incorporated with several assembly steps prior to securing the clam shell halves together. For example, some of the known designs require insertion of additional mounting or journaling pieces for retention of the visor pivot rod within the visor body. The construction of the visors having such a design is relatively time intense. Moreover, the various slides, journals retainers, etc., utilized in the construction may add significant expense and weight to the overall visor, along with unwanted noise and increase the number of components necessary to build one therein.

In one case, eliminating parts may reduce the expense of manufacturing and constructing a visor. The decrease in size and weight, however can be accompanied by a decrease in strength. Rotatable visors are a concern where flimsy construction of the visor core and slider components may be insufficient to withstand repeated torque actions on the visor shell itself, and in some cases cause dislodging or breaking of the components. Furthermore, the consumers of motor vehicles require visors that are nearly silent in operation and do not involve unwanted noises or sloppiness when sliding, pivoting or rotating the visors. Hence, it is thus desirable in the art to provide a visor that is lightweight, easy to manufacture and uses relatively few components, yet utilizes a design imparting significant durability to withstand heavy and repeated use and to provide a solid construction with tight tolerances throughout the entire system. Furthermore, there is a need in the art for an improved sliding visor that has a carrier that tracks and slides on only one half of a visor shell or substrate of a visor body. There is also a need in the art for a sun visor that uses a plurality of first bosses and second bosses that secures the first and second shell of the visor body to one another without screws.

SUMMARY OF THE INVENTION

One object of the present invention may be that it provides an improved sliding visor.

Another object of the present invention may be that it provides a sliding visor that has a carrier arranged over a pivot rod.

Yet a further object of the present invention may be that it provides a sliding visor that has a carrier that is slidingly secured to only one of the halves of a visor shell.

Still another object of the present invention may be that it provides a sliding visor that has a carrier with a first ride surface and a second ride surface that interengages with a monorail arranged on only the first shell of the visor body.

Still another object of the present invention may be that it provides a sliding visor that has a carrier that only engages and contacts one of the shells of the visor body.

Still another object of the present invention may be that it provides for a sliding visor that includes a monorail generally having a C-shape arranged on a first shell of the visor body.

Still another object of the present invention may be that it provides a sliding visor that has a carrier having a first ride surface, a second ride surface and a third ride surface arranged within a cavity of the carrier.

Yet another object of the present invention may be that it provides for a sliding visor that has a carrier that includes a steel spring arranged within a pocket therein to control slide on rod efforts by a second and third ride surface of the carrier.

Still another object of the present invention may be that it provides for a sliding visor that has a floating detent engaging the pivot rod and arranged within the carrier while being independent of the carrier.

Still another object of the present invention may be that it provides for a sliding visor that has a plurality of first bosses arranged on a first shell of the visor body and a plurality of smaller diameter second bosses arranged on the second shell of the visor body.

Still another object of the present invention may be that it provides for a sliding visor that has a plurality of first bosses that interact with a plurality of second bosses in a press fit manner to secure the first shell to the second shell thus creating a robust visor body therebetween.

Still another object of the present invention may be that it provides a sliding visor that uses a plurality of bosses on a first shell and a second shell wherein the bosses on one of the shells has a locking arm while the plurality of bosses on the opposite shell have a locking surface, wherein the locking arms and locking surfaces interact with one another to secure the first shell to the second shell thus creating a robust visor body.

Another object of the present invention may be that it provides a sliding visor that connects the first shell to the second shell without the use of screws.

Still another object of the present invention may be that it provides a sliding visor that is easy to manufacture, low in cost and robust for use by the driver of a vehicle.

According to the present invention, the foregoing and other objects and advantages are obtained by a novel design for a sliding visor for use in a vehicle. The sliding visor generally comprises a pivot rod and a carrier arranged on the pivot rod. The visor further comprises a first and second shell engagable to form a visor a body. The visor also comprises a monorail arranged on an inside surface of the first shell wherein the carrier is slidingly engaged with the first shell only. The carrier is also arranged and slidingly secured within or on the monorail. The carrier also contacts a top portion of the monorail and a bottom portion of the monorail when it is arranged within or on the monorail. The visor also comprises a plurality of bosses arranged on the first shell and a second shell which interengage with one another in a press fit manner to secure the first shell to the second shell to form the visor body without the use of screws.

One advantage of the present invention may be that it provides for an improved sliding visor.

A further advantage of the present invention may be that it provides for a sliding visor that has a carrier arranged on a pivot rod of the visor.

Yet another advantage of the present invention may be that it provides a sliding visor that has a carrier that is slidably retained and connected to only one shell of the visor body.

Yet another advantage of the present invention may be that it provides for a sliding visor that has a carrier with a first and second ride surface wherein that first and second ride surface contacts a first and second surface of a monorail attached to a first shell of the visor body.

Still another advantage of the present invention may be that it provides for a sliding visor that has a carrier that only rides on a first shell of the visor body, engaged with a monorail arranged along or near a top edge of the first shell of the visor body.

Still another advantage of the present invention may be that it provides a sliding visor that has a carrier with a first ride surface, a second ride surface and a third ride surface, all of which interact and interengage with a monorail on a first shell of a visor body.

Yet another advantage of the present invention may be that it provides for a sliding visor that includes a steel spring arranged within a pocket thereof used to control sliding on rod efforts of the carrier with respect to the monorail arranged on a first shell of the visor body.

Still another advantage of the present invention may be that it provides for a sliding visor that has a floating detent that engages the pivot rod and is arranged within the carrier while being independent of the carrier.

Still another advantage of the present invention may be that it provides a sliding visor that has a plurality of first bosses arranged on a first shell and a plurality of smaller diameter second bosses arranged on a second half shell.

Still another advantage of the present invention may be that it provides for a sliding visor that uses a plurality of bosses to create a press fit therebetween to secure the first shell to the second shell to form a robust visor body.

Still another advantage of the present invention may be that it provides a sliding visor that has a plurality of bosses on both a first shell and a second shell wherein those bosses on one shell include a locking arm while the bosses on the opposite shell include a locking surface which interengage with one another to secure the first shell to the second shell to form a robust visor body.

Still another advantage of the present invention may be that the visor body is made with a clam shell visor body configuration.

Still another advantage of the present invention may be that the sliding visor uses a separate first and second shell visor half to connect to one another to create a robust visor body.

Still another advantage of the present invention may be that it provides for a visor body having two half shells that have a plurality of teeth arranged around the periphery of a front edge and sides thereof to allow for tuck edging of a cover material over the outer surface of the visor body.

Yet another advantage of the present invention may be that it provides a sliding visor that is easy to manufacture, low in cost and ergonomically pleasing to the user of the visor.

Other objects, features and advantages of the present invention will become apparent from the subsequent description and appended claims, taken in conjunction with the accompanying drawings.

BRIEF DESCRIPTION OF THE DRAWINGS

FIG. 4 shows a partial side view of a sliding visor according to the present invention.

FIG. 5 shows a partial side view of a sliding visor according to the present invention.

FIG. 6 shows a cross section view of a sliding visor according to the present invention.

FIG. 22 shows a cross sectional view of an alternate embodiment of the sliding visor according to the present invention.

DESCRIPTION OF THE EMBODIMENT(S)

Figure 1:
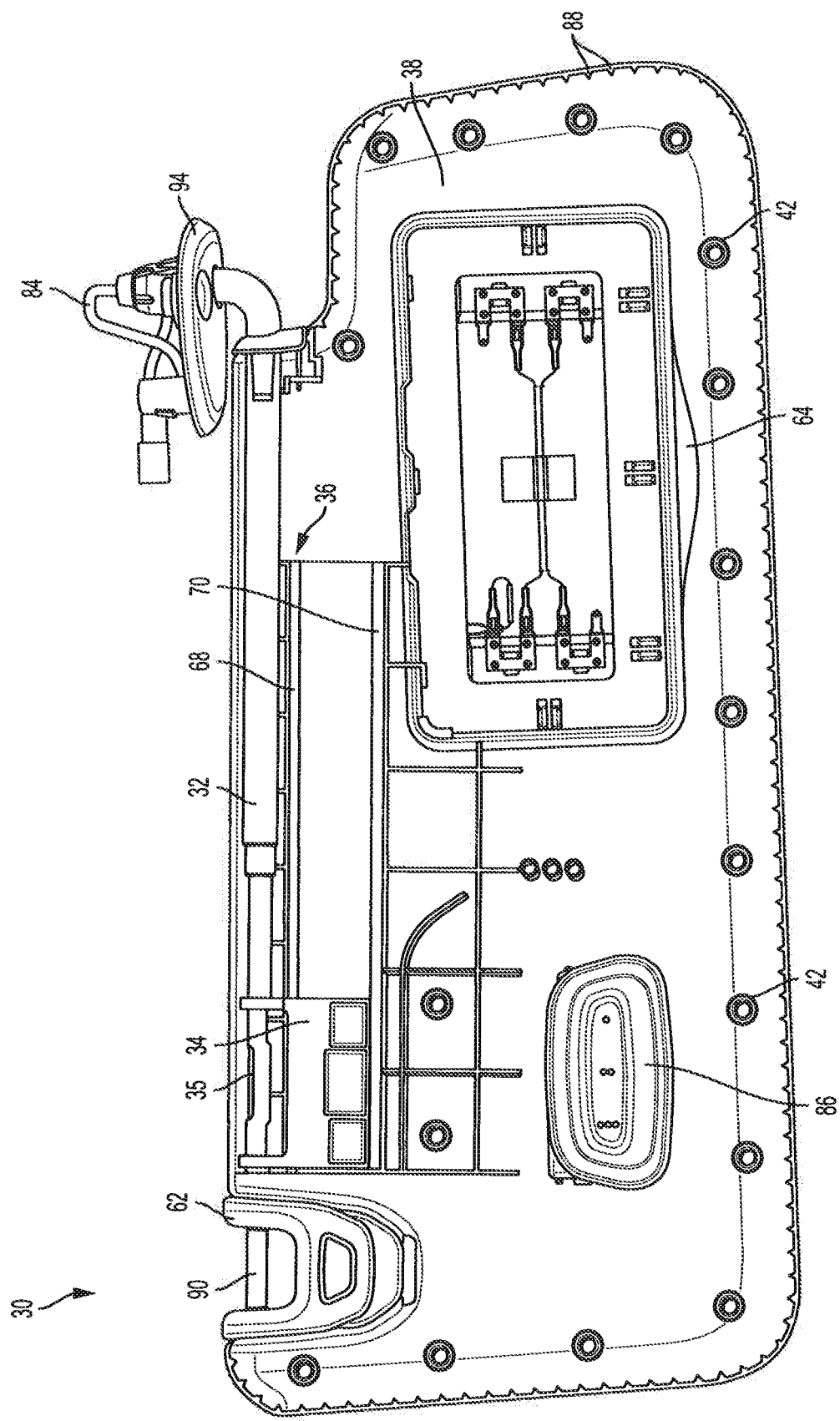
FIG. 1 shows a plan view of a sliding visor according to the present invention.
Figure 3:
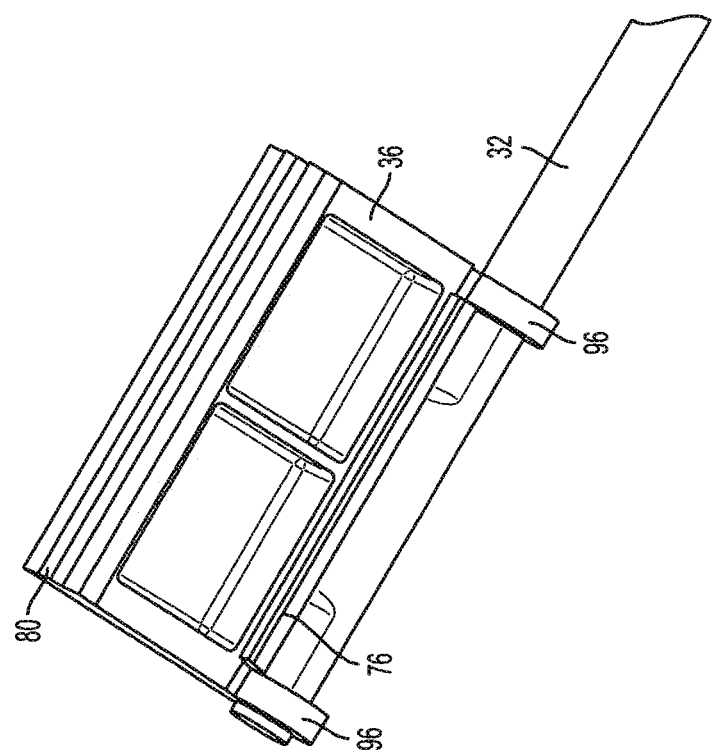
FIG. 3 shows a side view of a carrier of a sliding visor according to the present invention.
Figure 2:
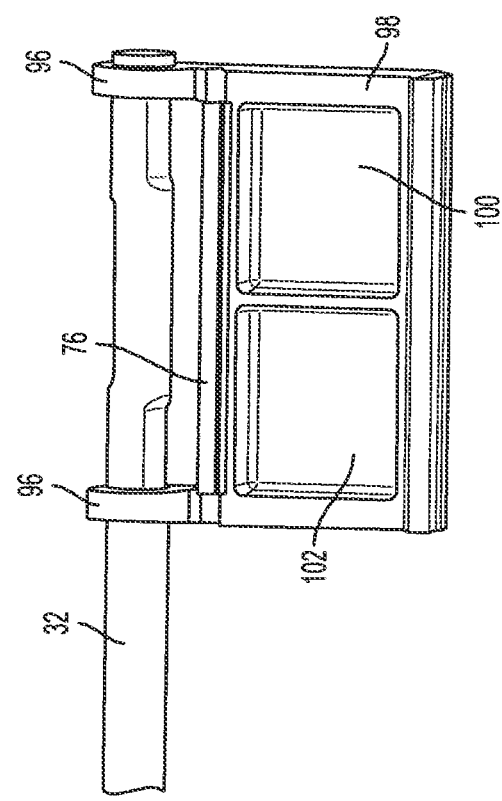
FIG. 2 shows a side view of the carrier of a sliding visor according to the present invention.
Figure 8:
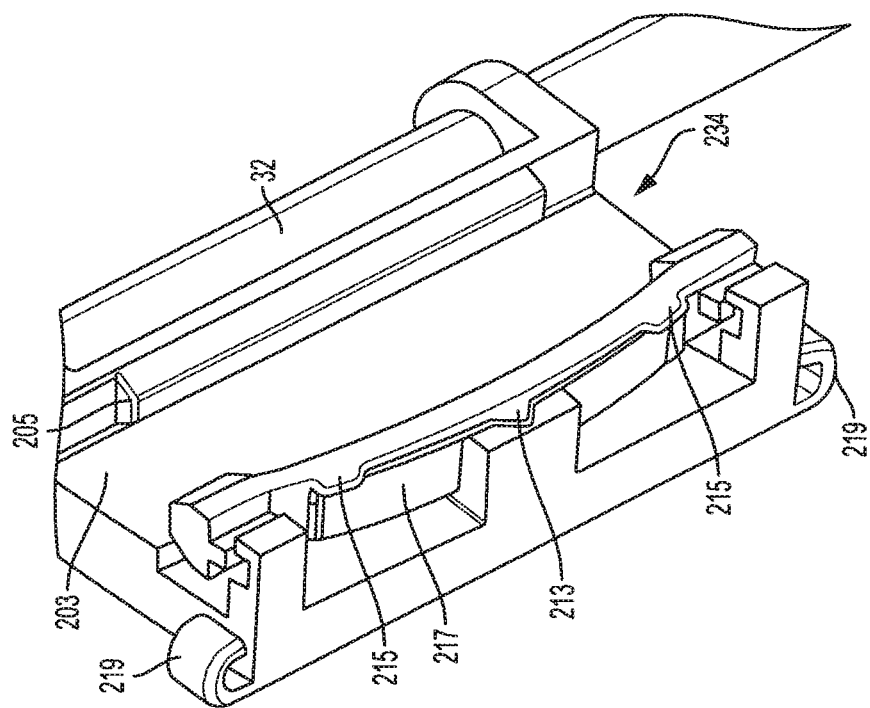
FIG. 8 shows a perspective view of an alternate embodiment of a carrier for a sliding visor according to the present invention.
Figure 7:
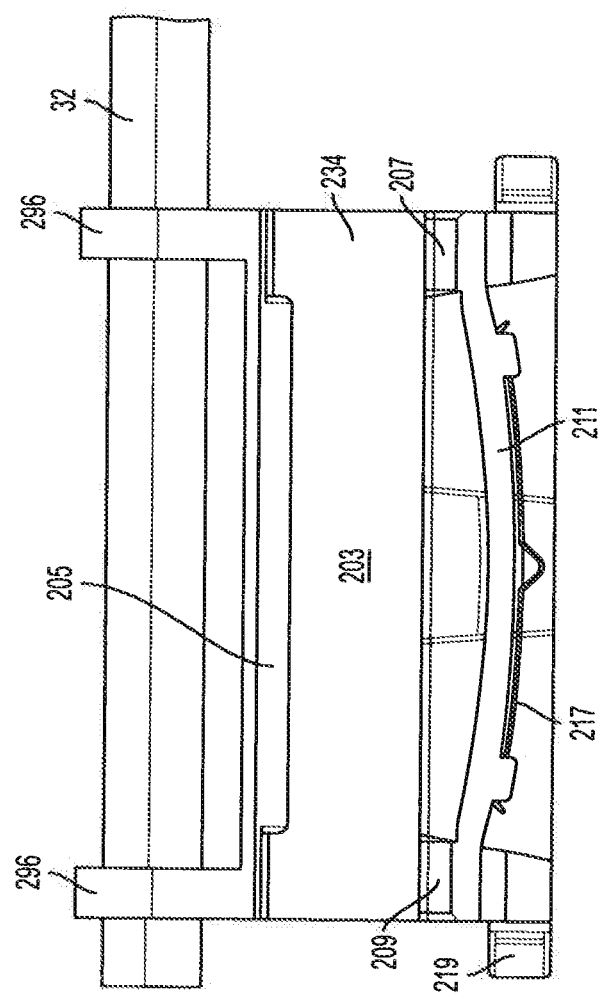
FIG. 7 shows an alternate embodiment of a carrier for a sliding visor according to the present invention.
Figure 11:
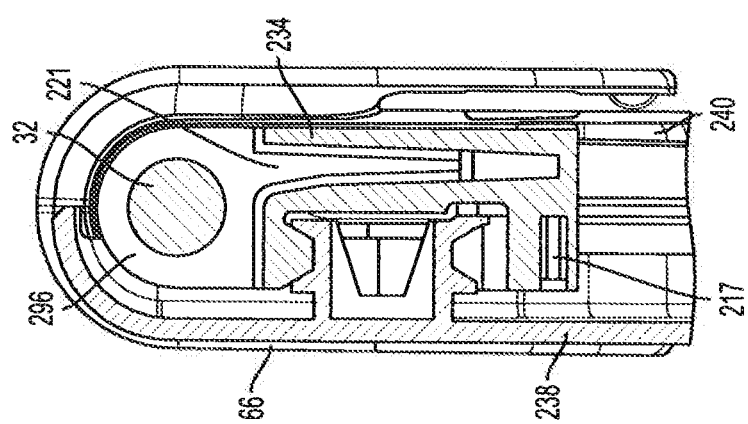
FIG. 11 shows a partial cross sectional view of an alternate embodiment of a sliding visor according to the present invention.
Figure 9:
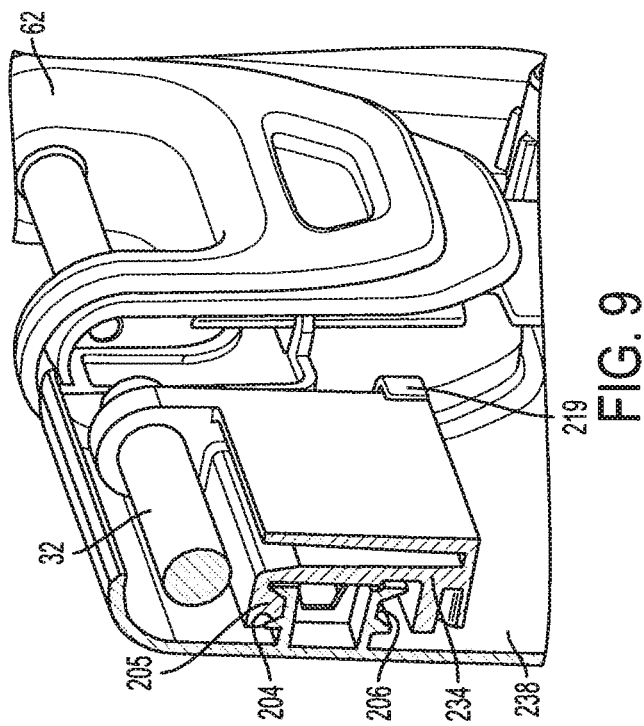
FIG. 9 shows a partial cross section of an alternate embodiment of a carrier according to the present invention.
Figure 10:
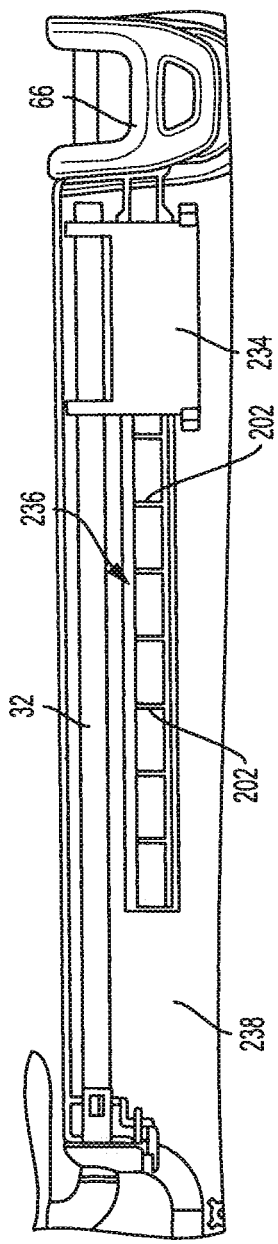
FIG. 10 shows a partial side view of an alternate embodiment of the sliding visor according to the present invention.
Figure 13:
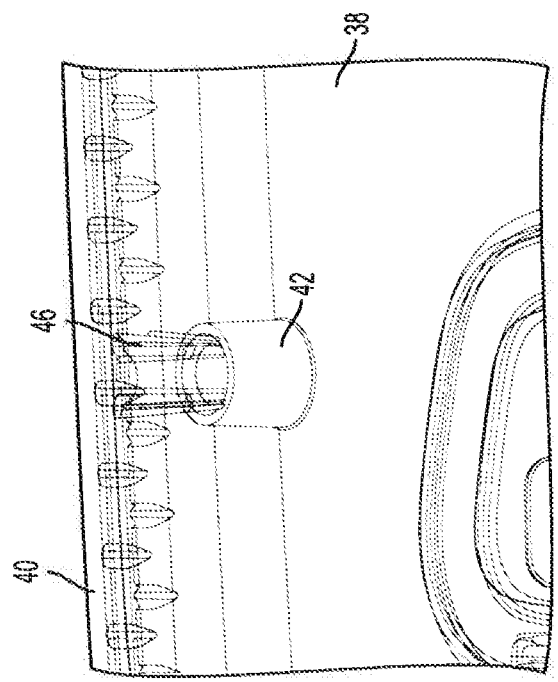
FIG. 13 shows a perspective view of a sliding visor and boss according to the present invention.
Figure 12:
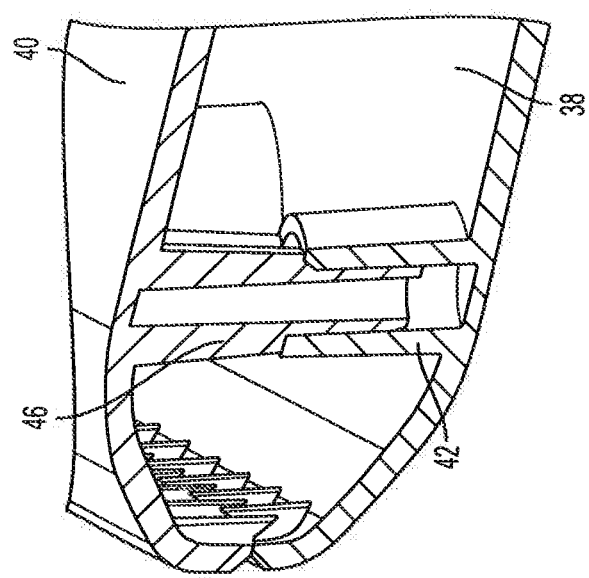
FIG. 12 shows a cross sectional view of the sliding visor and boss according to the present invention.
Figure 15:
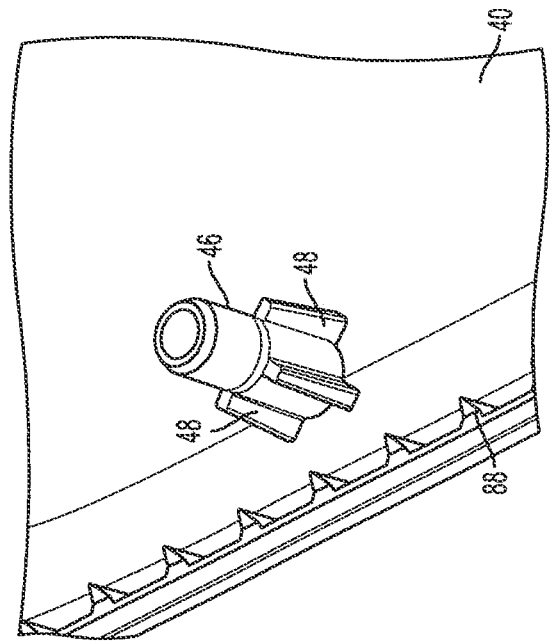
FIG. 15 shows a perspective view of a second boss of the sliding visor according to the present invention.
Figure 14:
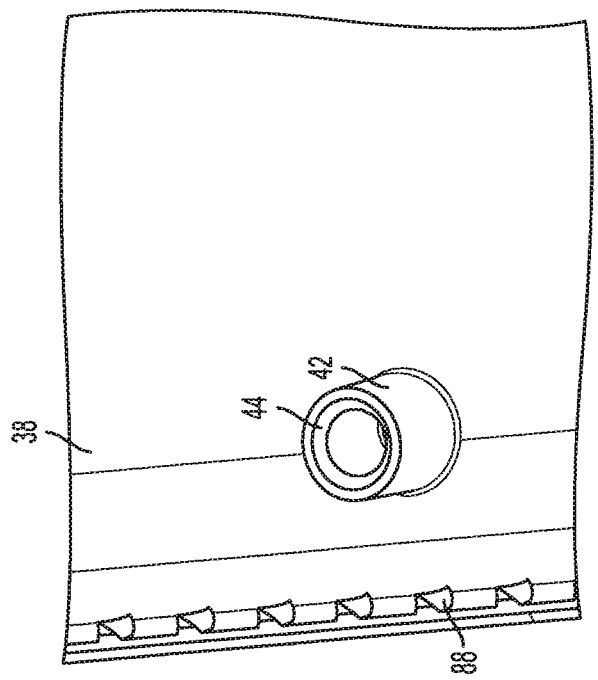
FIG. 14 shows a top view of a first boss of a sliding visor according to the present invention.
Figure 17:
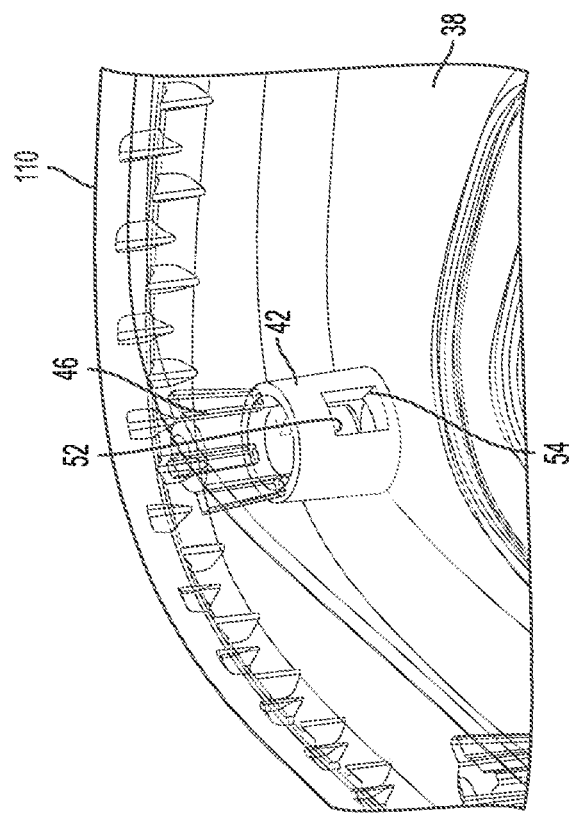
FIG. 17 shows a perspective view of an alternate embodiment of the sliding visor and boss according to the present invention.
Figure 16:
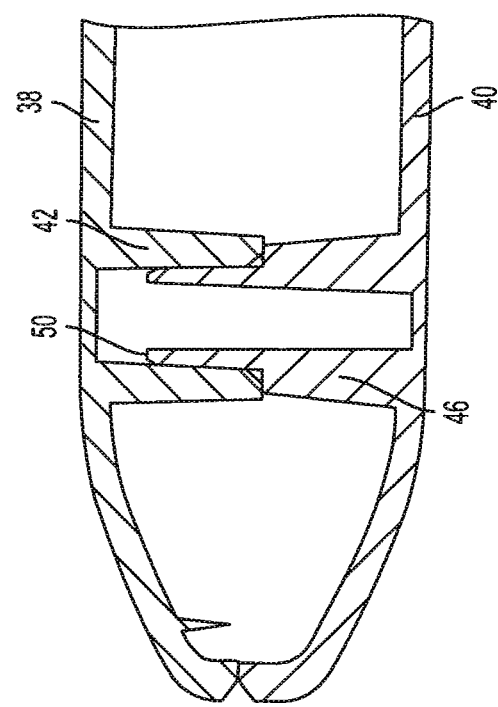
FIG. 16 shows a cross sectional view of the sliding visor and boss according to the present invention.
Figure 19:
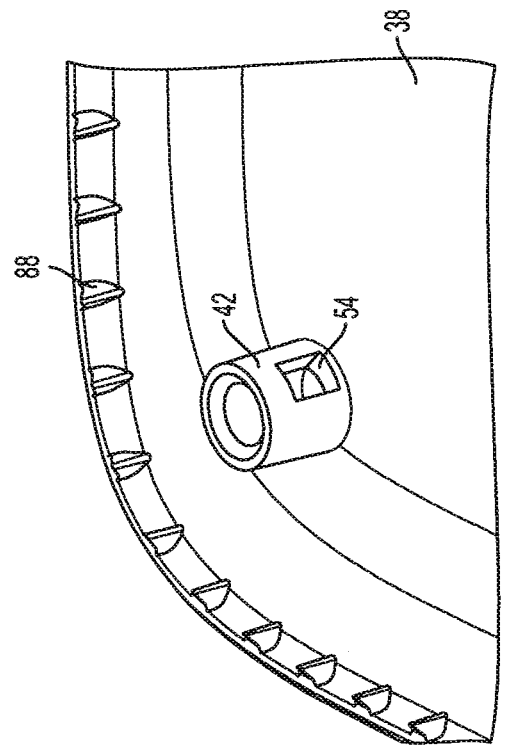
FIG. 19 shows an alternate embodiment of a first boss according to the present invention.
Figure 18:
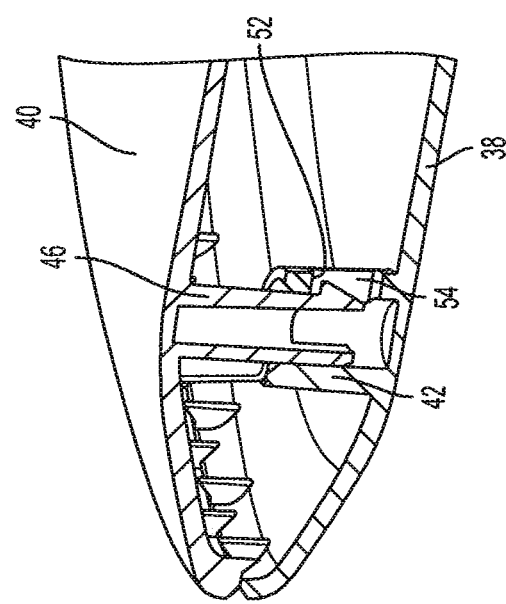
FIG. 18 shows a cross sectional view of an alternate embodiment of the sliding visor and boss according to the present invention.
Figure 21:
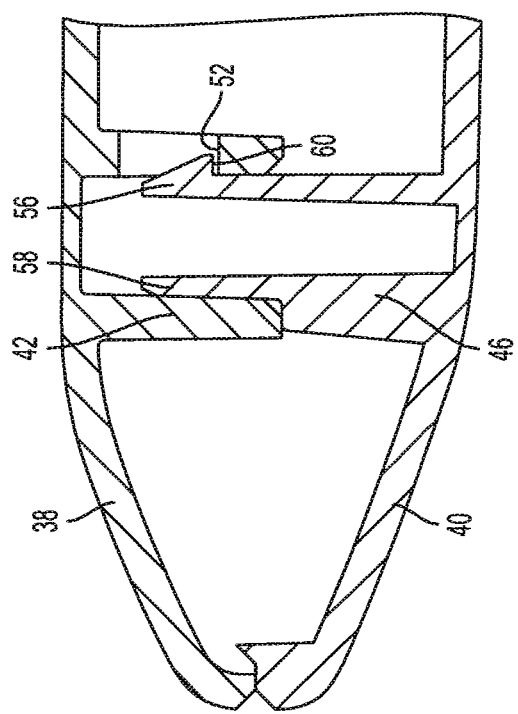
FIG. 21 shows a partial cross sectional view of an alternate embodiment of the sliding visor and boss according to the present invention.
Figure 20:
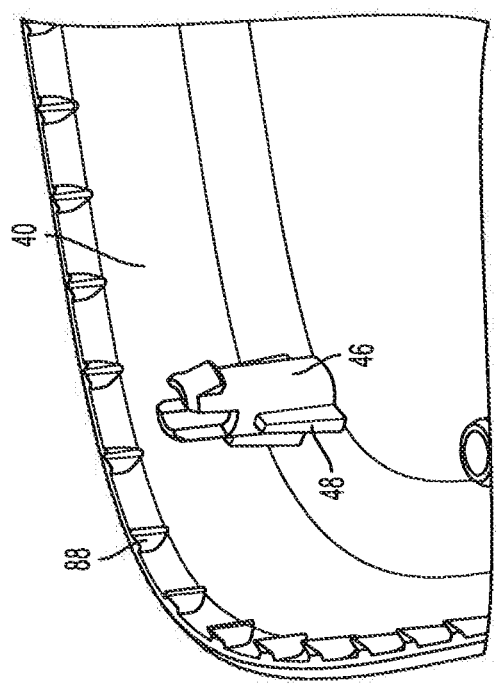
FIG. 20 shows a perspective view of an alternate embodiment of a second boss according to the present invention.

Referring to the drawings, there is shown a sliding visor 30 according to an embodiment of the present invention. Generally, the present invention broadly provides a clam shell type vehicle sun visor 30 or a non clam shell type vehicle sun visor 30, having a pivot rod 32 mounted to a carrier 34, wherein the pivot rod 32 and carrier 34 are slidably captured on a monorail 36, wherein that monorail 36 is arranged on only one of the shells 38,40 of the visor body. The carrier 34 thus rides on only one shell of the visor body on or within the monorail 36 which is molded or placed after the molding process integrally within only one of the shell portions 38,40 of the visor body. Similarly, the pivot rod 32 rides in the visor body, and a separate bracket, bezel or similar piece is not necessary to support the pivot rod 32. Related aspects of the present invention include methods for manufacturing a sun visor 30 also described herein. Furthermore, it should be noted that the visor 30 as shown in the present application can be used in any known type of vehicle, such as but not limited to, automotive vehicles, maritime vehicles, aerospace vehicles, military vehicles and any other known vehicle that has a need for the sun to be blocked from filtering into the interior compartment of the vehicle. It should also be noted that generally all of the components of the sliding visor 30, according to the present invention, maybe made of a plastic material that is capable of either being extruded, molded or shaped by any known manufacturing process. However, any other known metal, ceramic, plastic, composite, natural material or any other known material may also be used for any of the parts or components of the sliding visor 30 described herein.

In one embodiment shown in the Figures, the visor 30 includes a first 38 and second shell halve 40 or shells engagable to form the elongate visor body. Various molded features may be included on each shell to facilitate engagement of the shells 38,40. For example, complimentary structures may be formed on the respective visor shells 38,40 that allow a snap fit therebetween. In one contemplated embodiment, the shells 38,40 may be formed having integral or connected longitudinal peripheral edges, respectively. Other embodiments are contemplated in which the shells 38,40 are formed as separate, unconnected members. In one of these embodiments a plurality of first bosses 42 may be arranged on an inside surface of a first shell 38 of the visor body. The first boss 42 generally may have a cylindrical shape and may extend a predetermined distance from the inside surface of the shell 38. The first bosses 42 in one contemplated embodiment may be arranged along an outer peripheral edge of the visor body along with other first bosses 42 arranged at other interior positions within the shell, depending on the design requirements for the sliding visor 30. The first bosses 42 may be standing bosses and may have a predetermined diameter. Each of the first bosses 42 are generally of a cylindrical shape and may have a hollow inner bore therein, thus creates a predetermined inner diameter for the first bosses 42. It should be noted that any other shape other than cylindrical may be used for the first bosses 42, such as but not limited to square, triangular, star shape, or any other known or random shape may also be used for the shape of the first bosses 42. The top edge of the first boss 42 may have an angled surface 44 for help in receiving a second boss 46, which is arranged on a second shell 40 of the visor body. It should be noted that the first bosses 42 may be arranged anywhere on and extending from an inside surface of the first shell 38, not just at the outer periphery as described above, but in any random or predetermined locations on the interior surface of the first shell 38 of the visor body. A plurality of second bosses 46, generally having a cylindrical shape, may be arranged on and extend from an inside surface of the second shell 40 in such a manner that they may mirror the location and interengage with the first boss 42 when the two visor halve shells 38,40 are placed together. Generally, the second bosses 46 may also have a cylindrical shape with a predetermined length extending from an inside surface of the second shell 40, however any other known shape may be used as described above for the first boss 42. The second boss 46 also may have a an inner bore with a predetermined inner diameter and have a predetermined outer diameter wherein the outer diameter of the second boss 46 generally may be slightly smaller, larger, or equal to the inner diameter of the first boss 42. The second boss 46 may have a reduced outer diameter portion arranged on the top portion thereof, while the bottom portion of the second boss 46 generally may have the same outer diameter as that of the first boss 42. The second boss 46 may also have an outer diameter that generally is equal to or a little larger or less than the inner diameter of the first boss 42. The second boss 46 also may include a plurality of flanges 48 extending from an outer surface thereof in an outward direction. These flanges 48 generally may also extend from the inner surface of the second visor halve shell 40 and extend up approximately one half of the length of the second boss 46. The flanges 48, in one contemplated embodiment, may be placed at approximately 90° from one another such that four may be arranged in equal distance around the outer surface of the second boss 46. The flanges 48 may have any known thickness and length and may define a stop surface that interacts with the end of the first boss 42 when the visor shell halves 38,40 are secured to one another. The second boss 46 may also have a tapered surface 50 on an end thereof. The tapered surface 50 may interengage with the angled surface 44 during initial engagement of shells 38,40. In operation, when the first visor shell half 38 is connected to the second visor shell half 40, the first and second bosses 42,46 may be aligned with one another and thus interengage with one another, wherein the second boss 46 may be fitted and arranged within the inner bore of the first boss 42 and through a press fit interference secure the first shell halve 38 to the second shell halve 40 without the need for screws thus creating a robust visor body for the sliding visor 30 according to the present invention. Hence, by having the outer diameter of the second boss 46 generally equal to, slightly larger or smaller than the inner diameter of the first boss 42, a press fit interference may be created at multiple points around the visor shells 38, 40 to make the visor body into a robust unit.

In another embodiment of the sliding visor 30 the first bosses 42 are still arranged on and from the inside surface of the first halve shell 38 and the second bosses 46 are arranged on and from an inside surface of the second halve shell 40, however the first bosses 42 may include a locking surface 52 arranged on one surface thereof. The locking surface 52 generally may be formed by having a predetermined shaped orifice 54 arranged through an entire side surface of the first boss 42 at a predetermined position. Generally, this orifice 54 may be arranged along a surface of the first shell member 38 and generally forms a rectangular or square shape that extends a predetermined distance up the length of the cylindrical wall of the first boss 42 and has a predetermined width. This may form a locking surface 52 at the top portion of the orifice 54 on the first boss 42. The second boss 46 in the alternate embodiment, may have a locking finger or arm 56 extending from a top portion thereof. Hence, the diameter of the top portion of the second boss 46 may have a groove arranged therein, thus forming a locking finger or arm 56 on one side thereof and a second arm or finger 58 on the opposite side thereof. The locking arm 56 may include a locking surface or snap 60 generally in the shape of a triangular or ramp shaped surface extending from an outer surface thereof, thus creating a locking surface 60 on the second boss 46, which may interengage with the locking surface 52 of the first boss 42 in a snap fit manner. The second boss 46 may also include a plurality of flanges 48 at a predetermined locations. In one embodiment, there may be three flanges 48 arranged approximately 90° from one another and extending from an outside surface thereof. It should be noted a flange 48 may not be aligned with the locking finger 60 in one embodiment. Hence, the locking finger snap 60 and the locking orifice 54 of the first boss 42 may align with one another when the first shell 38 and the second shell 40 are aligned and secured to one another during construction of the visor body. The first finger 56 of the second boss 46 may be capable of flexing, thus allowing for the ramp surface of the snap 60 to ride along the inner bore of the first boss 42 until the first finger flexes and allows for a snap interengagement of the locking surface 60 of the snap feature on the second boss 46 to interengage with the locking surface 52 of the first boss 42. It should be noted that the first finger 56 and second finger 58 of the second boss 46 may also create an interference fit that occurs between the first boss 42 and the second boss 46 in addition to the snap lock feature which may occur between the first boss 42 and the second boss 46, thus creating a very robust and secure connection between the first shell 38 and the second shell 40 allowing for a robust and quiet sliding visor 30 for the user of the vehicle. Hence, either of these two embodiments may be used to secure the first shell 38 and the second shell 40 when they are formed as separate unconnected members according to the present invention. It should be noted that it is also contemplated to use connected clam shells with the bosses 42,46 for press fitting and/or press fitting with a snap lock feature on the visor shell halves 38,40 to connect one another or to use any other known prior art connecting method for connecting clam shell type visor halves or unconnected type visor halves according to the present invention.

The visor 30 may include a pivot rod 32 that is arranged into one end of the visor body and connected on the opposite end to a headliner or roof of the vehicle into which the sun visor 30 is arranged. The visor 30 is preferably formed such that the shells 38,40 may be closed about the pivot rod 32 and as such capture the pivot rod 32 therebetween in a single assembly step. Also, the visor 30 may include a carrier 34, which is slidably arranged and connected to only the first shell 38 of the slidable visor 30, thus securing the carrier 31 to only one of the shells without the need for installation of an internal retainer on the second visor halve or similar mechanism for mounting the pivot rod 32. All of the components parts of the visor 30 are manufactured from known materials and by known processes, such as but not limited to, any type of plastic, metal, ceramic, composite, natural materials, or any other known material and by any type of known or unknown molding technique, forming technique, chemical or mechanical process to design and make the components as described herein.

Generally, the shells 38,40 are formed by injection molding the plastic material in a conventional manner. For example, the shells 38,40 may be formed from a molded polyethylene or by some other suitable method and/or material. The first and second shells 38,40 generally include retaining surfaces and any known shape, such as arcuate retaining surfaces, flat or angled retaining surfaces, all of which may be elongated or trough shaped surfaces extending parallel to an edge of the visor shells 38,40 and defining a portion of a cylinder or wall. It should further be appreciated that the present invention may encompass designs with retaining surfaces that vary in dimension between longer, trough-shaped features and the narrow arcuate ledges as shown in the Figures. It should further be noted that an arcuate pair of surfaces may be aligned near one end of the visor shells 38,40 to allow for the pivot rod 32 to be properly supported and capable of rotating and sliding with relation to the visor body. In the embodiment shown, the visor half shells 38,40 may have only one of the visor halve shells with the appropriate bearing surfaces to hold and support the visor pivot rod 20 on one or both ends thereof. The visor half shells 38,40 may also have a channel formed near one edge thereof, wherein the channel may have a first and second bearing surface. These bearing surfaces are arranged at any known angle with relation to a center line of the visor body. In one contemplated embodiment, these angled surfaces may be arranged on each side of a channel that extends a predetermined distance along a longitudinal axis of the visor body. It should be noted that the visor half shells 38,40 may include other surfaces that receive and hold various components of the sliding visor 30, such as but not limited to the pivot rod 32, a D-ring 62, a vanity 64, and cover material 66 arranged over the visor body to complete assembly thereof. At the end of one portion of the channel defined by the first and second shells 38,40 may be a stop member. This stop member may extend a predetermined distance from a bottom surface of the channel to ensure the carrier 34 only slides a predetermined distance with respect to the visor body. The stop member may be of any known shape.

The shell halves 38,40 that form the visor body of the sliding visor 30 according to the present invention create a robust visor body. In one contemplated embodiment, a first shell 38 of the visor body may include a monorail 36 molded along and/or at or near a top edge thereof. The monorail 36 may extend a predetermined distance from the inside surface of the shell 38 and have a predetermined length according to the present invention. The monorail 36 generally may have a C-shape. This C-shape monorail 36 generally may form a channel having a top portion 68 and a bottom portion 70. The top portion 68 of the monorail 36 may have a generally L-shape flange that extends from the inner surface of the first shell 38. This L-shape may form a generally U-shaped channel 72 that is formed by the L-shape top portion of the monorail 36 and an interior surface of the first shell 38. It should be noted that a plurality of generally triangular support ribs or braces 74 are arranged along a top surface of the top portion 68 of the monorail 36 according to the present invention. The triangular shaped braces or support members 74 are placed at a predetermined position along the entire length of the top surface of the monorail 36. It should be noted that any other shape may be used for the top portion 68 of the monorail 36 according to the present invention. The use of the L-shaped flange extending from an inside surface for the top portion 38 of the monorail 36 may form the top of the C-shaped channel which in part defines the monorail 36 according to the present invention. The top portion 68 of the monorail 36 may have any known width and depth, thus allowing it to receive a first riding surface 76 of the carrier 34 therein. The bottom portion 70 of the monorail 36 extending from the inside surface of the first shell halve 38 may generally include a F-shaped flange, in cross section, extending from the inside surface of the first shell 38 a predetermined distance. It should be noted that other shaped flanges such as but not limited to a T-shape flange may also be used. The F-shaped flange 70 includes a first long flange portion and may then have a second flange or rail 78 extending from a generally mid point thereof perpendicular to the first flange of the bottom portion 70 of the monorail 36 and may also include a third flange extending from an end of the first flange according to the present invention. The rail 78 and third flange may be parallel to each other. The rail 78 generally may have a rectangular or square shape when viewed in cross section. Thus, a second ride surface 80 of the carrier 34 may be arranged over the second flange or rail 78 of the monorail 36 attached to only the first visor halve shell 38 of the visor body. The, monorail 36 may have a U-shaped channel or top ride surface 72 and a rail or bottom ride surface 78 extending from an interior surface of the first shell 38 of the visor body, thus allowing for the carrier 34 to be secured to and in contact with only one of the visor halve shells 38 during operation thereof. It should be noted that any other known shape may be used for the first ride surface channel 72 of the top portion 68 of the monorail 36 and the second ride surface or rail 78 arranged along the bottom portion 70 of the monorail 36. It should be noted that the bottom portion 70 of the monorail 36 according to the present invention may also include a plurality of support members or support beams 82, generally have a triangular shape arranged on a bottom surface thereof to help secure and make robust the bottom portion 70 of the monorail 36 according to the present invention. The triangular support members 82 may be arranged in an equal distance manner along the entire length of the bottom portion 70 of the monorail 36 according to the present invention. The top portion 68 and bottom portion 70 of the monorail 36 may have a predetermined length and may be arranged a predetermined distance from one another and from the top and bottom edge of the first shell halve 38 of the visor body. The carrier 34 may be slidingly secured within the monorail 36 of the visor body only on the first shell 38 according to the present invention. Once the carrier 34 is slid into one end of the monorail 36 it may be secured therein wherein it may not be capable of being removed from the monorail 36 unless the visor shell halves 38 are taken apart.

Another alternate embodiment of the visor body may have shell halves 38,40 that form the visor body of the sliding visor 30. According to this alternate embodiment, only the first shell 38 of the visor body is used to secure the carrier 234 in sliding interaction with the visor body. In this alternate embodiment a monorail 236 may extend from an inside surface of the first visor half shell 238. In this alternate embodiment, the monorail 236 may generally have a C-shape when viewed in cross section, wherein the C-shape extends from the inside surface of the visor first halve shell 238. It should be noted the monorail 236 may have a top portion or flange 268 and a bottom portion or flange 270 that both extend parallel to one another from the inside surface of the first shell 238. Arranged along and in an equal distance manner between the top portion 268 and bottom portion 270 of the monorail 236 may be a plurality of support ribs or members 202 that contact both the top portion 268 of the monorail 236 and the bottom portion 270 of the monorail 236 along with the inside surface of the visor first halve shell 238. The top portion or flange 268 of the monorail 236 generally may be straight and extend in a perpendicular manner away from the inside surface of the visor shell 238 while the bottom portion 270 of the monorail 236 may also extend away in a perpendicular manner as a straight flange such that it is parallel to the first straight flange 268 of the monorail 236. Arranged from a top surface of the top flange 268 of the monorail 236 is a generally V or partially V-shaped channel 204. Arranged from a bottom surface of the bottom flange 270 of the monorail 236 is a V or partially V-shaped channel 206. The V-shaped channels 204,206 may be used to hold and secure the carrier 234 to the monorail 236 such that the carrier 234 only has to interact with one of the halve shells 238, i.e., the first halve shell 238, to be slidingly secured within the visor body according to the present invention. Generally, the top channel 204 and bottom channel 206 of the monorail 236 may have a V-shape but it may also be seen as a U-shape depending on the cross sectional view and design requirements. The V-shape generally may allow for angled surfaces of both the top channel 204 and the bottom channel 206 to allow for sliding engagement and securing of the carrier 234 to the monorail 236 on both the bottom surface and the top surface thereof. In one contemplated embodiment, a bottom riding surface of the carrier 234 may have a spring force that urges the bottom riding surface of the carrier 234 to push in an upward direction toward and into the bottom channel 206 of the monorail 236 while the top channel 204 may use gravity or another force to provide the necessary force to hold the carrier 234 in the top channel 204. Thus, a force pointing in a downward direction and a spring force pointing in an upward direction, may securely hold the carrier 234 to the monorail 236 such that only the first shell 238 is necessary to slidingly secure the carrier 234 and pivot rod 32 within the vehicle visor body. It should be noted that any other shape may be used for the top channel 204 and bottom channel 206 of the monorail 236 according to the alternate embodiment of the present invention.

It should be noted that other contemplated methodologies and fasteners may be used to secure the two visor shell halves 38,40 to one another, but the embodiment shown including the bosses 42,46 which interact in a press fit and/or locking manner as described above is preferred. It should be noted that one of the shell halves 38,40 also may include a predetermined shaped orifice or cavity on an outer surface thereof that may be used to receive and secure a vanity 64 to the visor body. The orifice or cavity for receiving the vanity 64 may include a plurality of locking surfaces or locking arms that may interact with locking surfaces or flanges of a frame of the vanity 64 to ensure the vanity 64 is capable of being secured to the outer surface of one of the shells 38,40 of the visor body. The locking surfaces and fingers may have any known shape and are arranged such that both illuminated and non-illuminated visor vanities may be arranged therein. Other surfaces may also be molded into the visor half shells 38,40 to allow for placement of wires 84 to illuminate a visor vanity mirror or to receive a universal garage door opener 86 or other components directly into the visor body. The visor half shells 38,40 according to the present invention, may also include a plurality of teeth 88 arranged around an outer periphery of the front edge, side edges or all of the edges of each of the shell halves 38,40. The teeth 88 generally have a pyramidal or triangular like tooth shape and may either be directly aligned with one another from each half shell 38,40 or offset with one another from each half shell 38,40, depending on the design requirements and the tucking process to be used. It should be noted that the tuck edge teeth 88 may have any known shape other than triangular, pyramidal or conical, as shown in the drawings and may be offset or aligned with one another depending on the design requirements of the visor body. The teeth 88 arranged around the outer periphery may form a tuck edge wherein the outer covering material 66 used to cover the visor 30 during its final assembly process may be tucked into the gap formed between the teeth 88 and the teeth 88 on each shell half 38,40 may hold the material to present a taught, clean appearance on the outer surface of the visor body and a clean seam or line alone the outer front edge and/or sides of the visor body, which is generally visible to the user of the automotive vehicle. This use of the teeth 88 to form a tuck edge and to have the cover material 66 placed by a tuck edge process into engagement with the teeth 88 may create an aesthetically pleasing visor body having a taught, clean outer cover material 66 arranged thereover. It should be noted that in one contemplated embodiment the cover material 66 may be formed in the shape of a sock and the sock is arranged over one end of the visor body then the tuck process is used to create the clean front edge and side edges of the visor 30. However, any other known tuck process and cover material 66 that is not in the form of a sock may also be used depending on the design requirements and the visor 30 being created.

The sliding visor 30, according to the present invention, may also include a D-ring 62 secured to the visor body on a top edge thereof. The D-ring 62 may be any known D-ring. The D-ring 62 of the present invention may partially assist in holding the cover material 66 in a taught, clean manner over the outer surface of the visor half shells 38,40 formed into a visor body. The D-ring 62 also may include a rotating pin 90 which rotates 360° with respect to the body of the D-ring 62 and the visor body. As shown in the Figures, the rotating pin 90 may have a predetermined length and may or may not have a bore running along mid point thereof or only along a predetermined portion of the mid point of the rotating pin 90. The rotating pin 90 may have a predetermined diameter and may have a skirt like flange arranged on one end thereof. On the opposite end of the rotating pin 90 may be a locking shoulder that includes a circumferential flange extending from an outer surface thereof that interacts with a locking surface of the body of the D-ring 62. In operation, the assembler may take the rotating pin 90, pass it through an orifice in an arm of the D-ring 62 and insert it into the opposite orifice of the opposite arm of the D-ring 62 until the locking shoulder interacts with the locking surface of the D-ring 62. This will secure the rotating pin 90 to the D-ring 62 but allow for rotation of the rotating pin 90 with relation to the D-ring body and hence, the visor body. It should be noted that any known plastic, ceramic, composite, metal or natural material may be used to form both the rotating pin 90 and the D-ring 62 according to the present invention. The D-ring body generally has a saddle like shape with a leg extending down that may interact with a locking member arranged on one of the half shells 38,40 of the visor body. It should be noted that any other shape may be used for the D-ring body, not just that shown in the drawings.

The sliding visor 30 may also include a pivot rod 32 which is attached at one end to a bracket and connector 94 which is secured to the headliner or roof of a vehicle. The bracket 94 may have a connector secured thereto to connect the electrical system of the vehicle via a wire 84 to the bracket, the wire 84 is then passed through the pivot rod 32, which generally is hollow according to the present invention. However, it should be noted that a solid pivot rod 32 may be used, as long as it will be capable of passing electricity therethrough to allow for illumination of the vanity mirror if necessary. The bracket 94 may be secured to the roof of the vehicle via fasteners or any other known methodology. The bracket 94 includes an orifice that will receive one end of the pivot rod 32 near an elbow of the pivot rod 32, wherein the pivot rod 32 generally has an angle of 60°-120° at the elbow. The pivot rod 32 may be secured and capable of rotation within the orifice of the bracket 94 and may also be swung between a front windshield of the vehicle and a side window of the vehicle to block the sun from any angle. The pivot rod 32 may be of any known length and diameter depending on the design of the visor 30 and the automobile into which it is arranged. The wire 84 may be connected between the electrical system of the automobile and is passed through to a light bulb for illumination of a visor mirror in the vanity 64. It should be noted that the visor 30, pivot rod 32 and bracket 94 may be made of any known material such as but not limited to plastic, ceramic, composites, metals, or natural material, etc.

The visor pivot rod 32 is arranged within a top portion of a carrier 34, which is arranged within the monorail 36 of the first shell 38 of the visor body. The carrier 34 generally may have a rectangular shape when viewed from the side and may include a first arm 96 and a second arm 96 extending from a top surface thereof generally at an outer edge thereof. The arms 96 may have a circular bore arranged through a generally midpoint thereof and be used to receive the visor pivot rod 32 therein. A finger detent mechanism may be used to secure the visor pivot rod 32 within the first and second arm 96 of the carrier 34. In one contemplated embodiment the finger detent is a steel member, however any other type of material including but not limited to any other known metal, composite, plastic, ceramic, or natural material may be used for the detent of the visor 30 according to the present invention. The use of the detent may allow for the carrier 34 to be secured in an axial manner to the end of the visor pivot rod 32, but allow it to rotate with respect to the pivot rod 32. Thus, with the carrier 34 secured to the end of the pivot rod 32 in an axial direction, it may allow for the visor body to slide with relation to the pivot rod 32 and carrier 34 thus allowing for more precise placement of the visor body to block sun from entering the interior of the vehicle. When viewed from the side, the first and second arm 96 generally have a circular shape. The first and second arm 96 extend from the body of the carrier 31. The carrier body generally may have a first side 98 that may have a first 100 and second cavity 102 arranged a predetermined distance into the first side surface. The cavities 100, 102 may have a generally square shape, however any other known shape may be used and the cavities 100,102 are arranged in a side by side manner as shown in the figures in one contemplated embodiment. It should be noted that the cavities 100,102 may have a predetermined length, width and depth into the side surface 98 of the body of the carrier 34. Arranged along or near a top edge of the first side 98 of the carrier 34 may be a first ride surface 76. The first ride surface 76 generally may be a flange that has a generally rectangular or square shape. The flange may generally extend off a top surface of the side of the first side 98 of the carrier 34. It should be noted that any other shape may be used for the first ride surface or flange 76 depending on the design requirements of the carrier 34. Generally, the dimensions of the first ride surface 76 may mimic or be slightly smaller than the dimensions of the U-shaped channel 72 of the top portion of the monorail 36 of the visor first halve shell 38. This may allow for the first ride surface 76 to ride along in the generally U-shaped channel 72 of the top portion of the monorail 36 in a secure manner, thus allowing for the carrier top portion not to move away from in a direction away from the inner surface of the visor first halve shell 38. Arranged on a bottom surface of the visor carrier 34 is a second ride surface 80. The second ride surface 80 is in the form of a generally rectangular or square shaped slot 80 arranged along the entire length of the carrier 34. The slot 80 generally may have a predetermined depth and width which generally mimics that of the rail 78 extending from the bottom portion of the monorail 36 of the visor first shell halve 38. Hence, with the second ride surface or slot 80 extending the entire length of the carrier's body it may allow the carrier 34 to be slidingly secured within the monorail 36 of the first halve 38 of the visor shell body. Thus, within the monorail 36 the bottom surface of the carrier 34 may engage with the rail 78 of the monorail 36 on all three sides thereof and may also have the outer surface of the carrier 34 engage with an inside surface of the first shell visor body thus creating a slidingly secure connection at both the top portion and bottom portion of the carrier 34 and the top portion and bottom portion of the monorail 36. Thus, securing the carrier 34 on only one of the visor halve shells 38 in a novel manner. It should be noted that the slot 80 of the carrier 34 may have any known shape, as long as that shape mimics the shape of the rail 78 extending from the bottom portion of the monorail 36. A second side 104 surface of the carrier 34 may include a plurality of cavities formed at or near a bottom edge thereof. In one contemplated embodiment, a first 106, second 108 and third cavity 110 are formed wherein the first 106 and third cavity 110 are of the same shape and arranged along the respective side edges and bottom edges of the carrier side surface, while the second cavity 108 is a little larger in size and arranged only along the bottom edge of the carrier 34 and an edge of both the first 106 and third cavity 110. It should be noted that these cavities may have any known depth or shape and may or may not even be included on the carrier body, depending on the design requirements of the visor body. Thus, the carrier 34 may be secured to only the first halve shell 38 via the first ride surface 76 and second ride surface 80 of the carrier 34 interengaging with the top portion and bottom portion of the monorail 36 such that it is slindingly locked within the generally C-shaped monorail 36 according to the present invention. This may allow for the carrier 34 to slide freely along the predetermined length of the top portion of the visor 30 allowing the visor 30 to be placed in different positions within the interior of the vehicle. It would also allow for the visor 30 to be rotated into different positions even while being slid in an axial direction according to the present invention.

In an alternate embodiment, the carrier 234 may have an alternate design which also may still allow for it to be arranged to a monorail 236 that has a different design than as described above. In the alternate embodiment of the sliding visor 30, the carrier 234 may be arranged on a monorail 236 that is only attached to a first halve shell 238 of the visor body. From a side view the alternate carrier 234 may have a generally rectangular shape with a first arm 296 and a second arm 296 extending from a top surface thereof. Generally, the arms 296 are arranged along the outer edge of the visor body when viewed from a side. The first and second arm 296 of the carrier 234 may include a generally circular bore through a midpoint thereof thus allowing for the visor pivot rod 32 to be arranged therein and secured in an axial manner to the visor carrier 234. Generally, a detent finger may be used to secure the visor pivot rod 32 to the carrier 234. This finger detent generally is made of a steel material, however any other type of material, such as any known metal, plastic, ceramic, composite or natural material may also be used. Generally, this finger detent may allow for the carrier 234 to be axially fixed with respect to the end of the visor pivot rod 32 but allow for rotation with respect to the pivot rod 32, thus allowing for the visor body to be rotated from a stored position down to a use position to block sun from entering either the front window or side window of the vehicle. The carrier 234 may have a predetermined shaped cavity 203 arranged in a first side thereof. Generally, the cavity 203 may extend the entire length of the carrier body and may have a rectangular shape when viewed in cross section. Arranged and extending from a top surface of the cavity 203 of the carrier 231 may be a first ride surface 205 which generally has a triangular or V or partial V shape. The first V-shaped ride surface generally may be a flange 205 that extends from an inside surface from the cavity 203 of the carrier 234. The first flange 205 may extend a predetermined distance and may have generally angled surfaces on a first and second side and a flat bottom portion when viewed in cross section. It should be noted that any other shape may be used for the first flange 205 extending from a top portion of the cavity 203 of the carrier 234.

Arranged and extending from a bottom portion of the cavity 203 of the carrier 234 may be a second 207 and third ride surface 209 arranged at the end of flexible fingers or a leaf spring 211. The flexible fingers are arranged on a leaf spring type mechanism 211 that extends from a bottom portion of the cavity 203 of the carrier 231. It should be noted that the first ride surface 205 may extend the entire length of the carrier 234 or only a predetermined portion of that carrier 234 depending on the design requirements. Generally, the first, second and third ride surface 205, 207, 209 arranged at or near the edge of the cavity 203 of the carrier 234. The second and third ride surfaces or flexible fingers 207,209 being arranged at or near the edge of a generally leaf spring like member 211 may allow for the ends to flex in an upward direction towards the top of the cavity 203 of the carrier 234. The leaf spring 211 extends from an inside surface of the cavity 203 and is generally secured at or near a midpoint thereof to the cavity 203 which allows for the first and second flex finger of the leaf spring 211 to move independently of one another from a midpoint of the leaf spring 211. The mid point of the leaf spring 211 may have arranged there at a triangular or circular tooth 213 that extends across a width thereof on a bottom surface of the leaf spring 211. Also, extending from a side surface of the leaf spring 211 may be a first and second tab 215. The tabs 215 in conjunction with the inner wall surface of the cavity 203 may form a pocket to secure a spring 217 which is used to control the slide on rod efforts of the second and third ride surface 207,209 arranged on the end of the flexible fingers found on the end of the leaf spring member 211. Extending from an inside surface of the cavity 203 of the carrier 234 may be a first, second and third flange with the first and third flange arranged near the outer edge of the carrier 234 while the second flange is arranged generally at a mid point of the carrier 234 and serves to hold the carrier spring 217 with relation to the leaf spring mechanism 211.

It should be noted that the first and third flange of the carrier 234 may have a slot of any known shape, such as the square shape shown, arranged in a top surface thereof. The slot may be used to interact with and allow for a rail or flange extending from a bottom surface of the second ride surface 207 and third ride surface 209 to enter into the slot to allow for proper engagement and securing of the carrier 234 to the monorail 236 of the first halve shell 238. Thus, with the slots on the outer edge flanges it may allow the flexible fingers to move in a downward direction, thus allowing for a secure sliding relationship between the monorail 236 and the carrier 234. It should be noted that the end of the second and third ride surfaces 207,209 generally may have a V shaped flange extending in an upward direction from a top surface thereof. These flanges 207,209 generally may mimic the first flange 205 as described above. These flanges 207,209 may extend a predetermined distance from the edge of the top surface in an inward direction and may extend inward from the edge of the two top side surfaces a predetermined distance thus allowing for a secure engagement between the second and third flexible fingers 207,209 and the bottom channel 206 of the monorail 236. The carrier 234 may also include a generally U shaped flanges 219 extending from each side surface. The U shaped flanges 219 generally may be arranged at or near a bottom surface of the first end and second end of the carrier 234. The flanges 219 may be used as stops to interact with other portions of the first visor shell halve 238 to ensure quiet operation of the sliding visor mechanism or may be used to secure and hold wires of the visor 30 in a predetermined place or position while the carrier 234 travels on the monorail 236.

In operation, after the carrier 234 is molded a generally steel carrier spring 217 may be inserted into a pocket and engage with the tabs 215, an inner wall of the cavity 203 of the carrier 234 and with a top surface of the second flange and with almost the entire bottom surface of the leaf spring member 211 to allow for the proper spring force to be applied in an upward direction such that the second and third ride surfaces 207,209 are biased in an upward direction towards the top of the carrier 234. The carrier 234 after the spring 217 is inserted therein may be arranged over one end of the monorail 236 and then have a pivot rod 32 placed in the carrier 234 and secured via a spring detent. The first ride surface 205 may engage with the top channel 204 of the monorail 236 and the second and third ride surface 207,209 of the carrier 234 may engage with the bottom channel 206 of the monorail 236 with the spring force urging the second and third ride surfaces 207,209 in an upward direction towards the top of the carrier 234. This may assure a secure but sliding arrangement occurs between the ride surfaces of the carrier 234 and the top and bottom channel 204,206 of the monorail 236 thus allowing for a secure engagement that is also capable of having sliding occur between the carrier 234 and only the first halve shell 238 of the visor body. It should further be noted that the carrier 234 may also include a slot 221 arranged into a top surface of the carrier 234 between the first side and second side of the carrier body. The slot 221 may extend nearly the entire height of the carrier body and between the first and second arm 296 of the carrier 234 thus forming a generally rectangular or V shaped pocket therein.

The sliding visor 30 of the present invention may also include a detent which is independent of the carrier 34 and hence there is no interface via rivets or fasteners with the carrier 34. Generally, the detent 35 is arranged and engaged with an outer surface of the pivot rod 32 and within the carrier 34. The detent 35 does not connect to the carrier 34 via rivet or other fastener, but is locked into the carrier 34 via its shape. Its shape generally is that of an oval when viewed from a cross sectional side view. One end of the detent may have a locking clasp mechanism, which may also engage with a bottom surface or inner surface of the carrier 34 to create the detent independent of carrier interface that is required. This may create low effort for the detent and rotation thereof with respect to the pivot rod 32. It should be noted that any other shape detent, such as the detents used by the Applicant in previous visors, may also be used according to the present invention. It is also contemplated to have a detent that is secured to the carrier 34 by either a rivet or other fastener and is not a floating detent as described herein. Generally, the detent is made of a steel material, however any other known material such as plastic, ceramic, composite, or any other metal or natural material may also be used for the detent according to the present invention.

The sliding visor 30 also may include a wire routing system that passes a wire 84 from the bracket 94 through the pivot rod 32 to the vanity light for illumination of a vanity mirror therein. In one contemplated embodiment, a pivot point lever arm may be pivotally connected to one end of the carrier 34 via orifices arranged within the floating carrier. It is also contemplated in another wiring route option in which the wire 84 exits directly out of the end of the carrier 34 into a tube protector or it is also contemplated that no tube protector is used and that the wire 84 is just placed in a predetermined position within the visor body and allowed to move with relation to the pivot rod 32 when the visor slides, thus allowing for the wires 84 to never be comprised during rotation or sliding of the visor 30. It is also contemplated to use other types of electricity to power the vanity light if a vanity light is chosen, such as a battery pack, or any other known wiring route or system that is capable to bring electricity from the vehicle directly to the visor vanity light.

The sliding visor 30 may also include a vanity member 64. The vanity member 64 generally includes a vanity door, door springs, a vanity frame, a vanity mirror with optional lights arranged thereon. If the vanity 64 is illuminated, the vanity 64 may also include at least one lens to disperse light in a predetermined manner. The vanity frame generally may include at least one, but may include two connecting flanges arranged near or at a bottom surface of the vanity frame. On the opposite end of the vanity frame may be arranged at least one locking shoulder or surface that may interact with locking tabs arranged on a surface of one of the visor shell halves 38,40. This will allow for the vanity frame and vanity 64 to be secured to the visor body without fasteners, such as screws, etc. It should be noted that other type of members may be used to secure the vanity member 64 to the visor body other than that described herein. In one contemplated embodiment the use of the vanity secure system with the vanity visor body wherein a snap in system does not require fasteners such as screws to secure the vanity system the visor body is preferred. It should be noted that the visor half shell that holds and supports the vanity 64 may also include a plurality of arcuate holders to hold and secure light bulbs or LED's which are used to illuminate the visor vanity with respect to the vanity frame if such lighting is required. It should be noted that it is also contemplated to have only one light bulb or LED arranged in the visor or no light bulbs arranged in the visor and just a vanity mirror arranged therein. All of these surfaces are premolded into the visor half shell into which the vanity 64 may be arranged and secured.

The vanity 64 may also include a vanity door, which is pivotally connected to the vanity frame via door springs. The door springs generally have a C or U shape when viewed from a side. The door spring may use a cam interference to door hinge the vanity system 64. One end of the vanity spring may be arranged within a surface of the vanity frame. The opposite end of the door spring may engage and interact with a cam arranged on a door hinge of the door of the vanity 64. The hinge may have the cam surface adjacent to an orifice through the door hinge, which may allow for the cam interference to create an acting force on the spring which is perpendicular to the pocket rather than the direction of installation. It should further be noted that the door spring may have a sufficient preload or interference between the door and spring to ensure that the door effort does not fall below a predetermined effort, arranged adjacent to at least one of the door hinges may be a switch used to close the circuit to illuminate the light of the vanity 64. The switch in one embodiment may be a plunger switch, which when the vanity door is placed in an open position a surface of the vanity door, such as one of the hinges may interact with the plunger switch, thus depressing the plunger switch and closing the circuit and illuminating the light bulb or LED's arranged adjacent to the vanity mirror of the vanity 64. It should be noted that other types of switches may also be used depending on the design requirements of the visor 30.

In operation, the carrier 34 of the visor 30 according to the present invention may be secured and only engage and contact the first shell 38 of the visor body. It does not matter which shell 38,40 the monorail 36 is molded on, but just that only one of the shells 38,40 may be used to secure and slidably hold and move the carrier 34 within the visor body. As described above, generally a monorail 36 having a C shape may be secured to an inside surface of one of the halve shells 38,40 of the visor body. After the visor halve shell 38 is molded a carrier 34 may either be placed within a monorail 36 in one embodiment of the sliding visor 30 or on a monorail 236 of one embodiment of the sliding visor 30. The carrier 34 may hence be secured to just one of the visor halve shells during operation thereof. It may have no contact with the other visor halve shell, thus the tolerances may only have to be precise on the one visor halve shell where the monorail 36 is secured thereto. It should be noted that generally it is contemplated to mold the monorail 36 directly onto the inside surface of the visor first halve shell 38, however it may be placed onto the visor halve shell 38 after molding thereof. The use of a monorail 36 to secure the carrier 34 may reduce parts and complexity of the visor body, thus allowing for easier manufacturing of the parts and easier assembly of the sliding visor 30 after molding of the parts has occurred. In one of the contemplated embodiments the carrier 34 may be arranged within a monorail 36 such that a first ride surface and a second ride surface of the carrier 34 are enclosed within a first ride channel and over a first rail of a monorail 36. In a second embodiment, the carrier 234 may be placed on or over the monorail 236 such that an inner cavity of the carrier 234 may interact with a top channel of the monorail 236 and a bottom channel of the monorail 236 thus securing the carrier 234 to the outside surfaces of the monorail 236 in the second embodiment. The first embodiment secures the carrier 34 within and to an inside surface of the monorail 36 while the second embodiment secures the carrier 234 to the outside surfaces of the monorail 236. After or before the carrier 34 is secured either within the monorail in one embodiment or over the outer surface of the monorail in the second embodiment a pivot rod 32 may be arranged through the arms of the carrier 34 and secured via a detent. Then the second visor halve shell 40 may be aligned and secured to the first visor halve shell 38 and via the first and second bosses 42,46 molded on the respective inner surfaces thereof in order to secure the halve shells 38, 40 to one another to form a robust visor body that is capable of sliding with respect to the pivot rod 32 thus creating a sliding visor 30 for use within a vehicle of any type. Therefore, with the carrier 34 completely secured to only one halve visor shell 38 it may reduce the complexity of the visor components and the costs for making, manufacturing and final assembly thereof.

The present invention has been described in an illustrative manner. It is to be understood that the terminology which has been used is intended to be in the nature of words of description rather than that of limitation.

Many modifications and variations of the present invention are possible in light of the above teachings. Therefore, within the scope of the appended claims, the present invention may be practiced otherwise than as specifically described.

What is claimed is:

1. A visor for use in a vehicle, said visor comprising:
   a pivot rod;
   a first and second shell being engageable to form a visor body;
   a cover arranged over said visor body; and
   said first shell having a plurality of first bosses extending from an inside surface thereof, said first bosses generally have a cylindrical shape, said second shell having a plurality of second bosses extending from an inside surface thereof, said second bosses having a smaller diameter than said first bosses, said second bosses having a plurality of flanges extending from an outside surface thereof, an end of said plurality of flanges contacts an end of said first bosses.

2. The visor of claim 1 wherein said first shell is secured to said second shell by a press fit interaction between said plurality of first bosses and said plurality of second bosses.

3. The visor of claim 1 wherein at least one of said first bosses having a locking surface arranged in a surface thereof.

4. The visor of claim 3 wherein at least one of said second bosses having a locking finger.

5. The visor of claim 4 wherein said locking finger engages with said locking surface to help secure said first shell to said second shell.

6. The visor of claim 1 wherein said first and second shells are arranged in a clamshell design.

7. The visor of claim 1 wherein said plurality of first bosses having a top edge with an angled surface.

8. The visor of claim 1 wherein said plurality of first bosses having an orifice arranged through a side surface thereof.

9. The visor of claim 1 wherein said plurality of flanges of said second bosses total four, said plurality of said flanges are arranged approximately 90° from one another.

10. The visor of claim 1 wherein said plurality of flanges of said second bosses extend approximately one half of the length of said second bosses and from an inside surface of said second shell.

11. The visor of claim 1 wherein said second bosses having a tapered surface on an end thereof.

12. The visor of claim 4 wherein said plurality of flanges of said second bosses having a total of three, said plurality of flanges are arranged at approximately 90° intervals.

13. The visor of claim 12 wherein said plurality of flanges are arranged without aligning with said locking finger.

14. The visor of claim 4 wherein said locking finger having a ramp shaped surface.

15. A method of manufacturing a sun visor comprising the steps of:
- molding a first and second visor shell, said first shell having a monorail molded on an interior side thereof;
- securing a carrier attached to a pivot rod to said monorail, said carrier slides with respect to said monorail, said carrier slides and rides on only said first visor shell; and
- attaching said first shell to said second shell with a plurality of press fit bosses, said first shell having a plurality of first bosses extending from an inside surface thereof, said first bosses generally have a cylindrical shape, said second shell having a plurality of second bosses extending from an inside surface thereof, said second bosses having a smaller diameter than said first bosses, said second bosses having a plurality of flanges extending from an outside surface thereof, an end of said plurality of flanges contacts an end of said first bosses, said first shell and said second shell are secured to each other without a screw.

* * * * *

US 11,312,211 C1

(12) EX PARTE REEXAMINATION CERTIFICATE (12807th)
United States Patent
Huff et al.

(10) Number: US 11,312,211 C1
(45) Certificate Issued: Dec. 19, 2024

(54) SLIDING VISOR

(71) Applicant: Irvin Automotive Products, LLC, Pontiac, MI (US)

(72) Inventors: David Huff, Waterford, MI (US); Aaron Levine, Commerce Township, MI (US)

(73) Assignee: IRVIN AUTOMOTIVE PRODUCTS, LLC, Pontiac, MI (US)

Reexamination Request:
No. 90/019,097, Jul. 6, 2022

Reexamination Certificate for:
Patent No.: 11,312,211
Issued: Apr. 26, 2022
Appl. No.: 16/876,448
Filed: May 18, 2020

(51) Int. Cl.
B60J 3/02 (2006.01)
(52) U.S. Cl.
CPC ........... B60J 3/0239 (2013.01); B60J 3/0278 (2013.01)

(58) Field of Classification Search
None
See application file for complete search history.

(56) References Cited

To view the complete listing of prior art documents cited during the proceeding for Reexamination Control Number 90/019,097, please refer to the USPTO's Patent Electronic System.

Primary Examiner — Russell D Stormer

(57) ABSTRACT

A sliding sun visor for use in a vehicle is disclosed. The sun visor includes a first and second visor body shell. The visor also comprises a pivot rod and a carrier slidingly arranged over the pivot rod. The first shell of the visor body includes a monorail arranged on an inside surface thereof. The carrier is slidingly engaged with the first shell wherein the carrier is arranged within or on the monorail. The carrier contacts a top portion of the monorail and a bottom portion of the monorail. The carrier is hence slidingly secured to the monorail and only connected to one of the shells used to engage to form a visor body. The visor bodies are secured via a press fit between a first boss arranged on a first shell and a second boss arranged on the second shell thus creating a secure connection that does not need screws to secure the visor halves to one another.

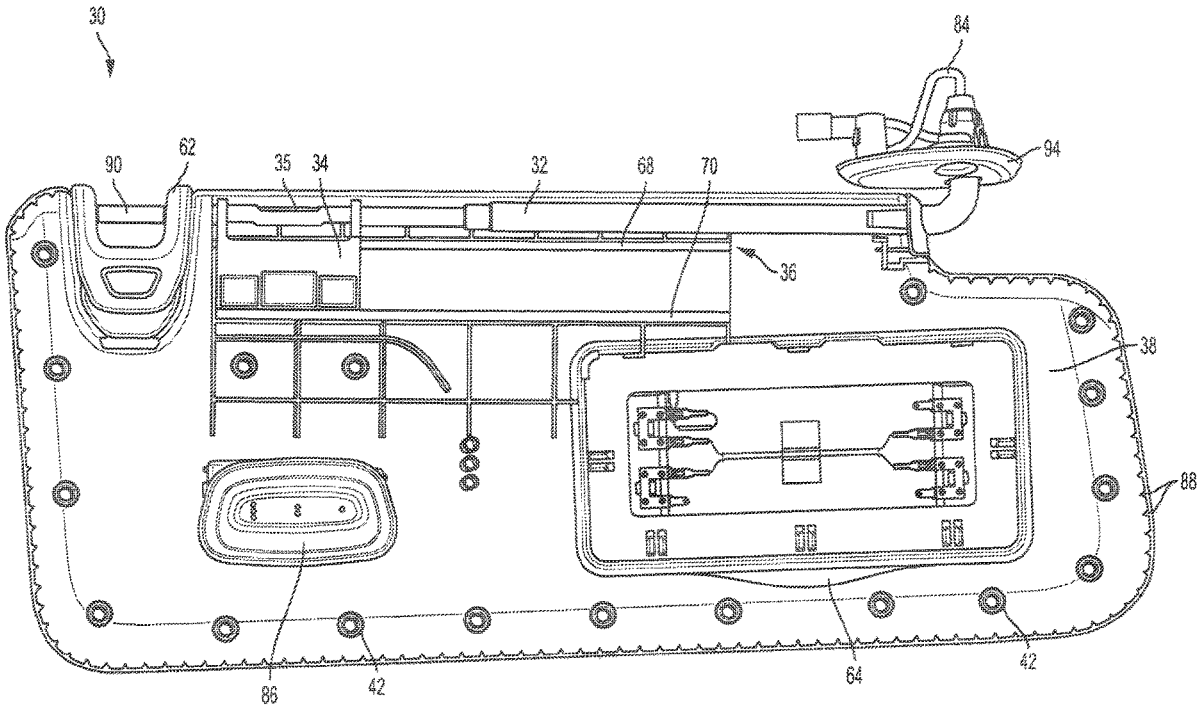

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-15 are cancelled.

\* \* \* \* \*